2,979,504

THIOCARBAMYLSULFENAMIDE CONTAINING ACETYLENIC GROUP

George E. P. Smith, Jr., Akron, Ohio, assignor to The Firestone Tire & Rubber Company, Akron, Ohio, a corporation of Ohio No Drawing. Filed June 5, 1958, Ser. No. 739,980

1 Claim. (Cl. 260—247.1)

This invention relates to a new class of chemical compounds, the thiocarbamylsulfenamides containing acetylenic groups, and the application of these substances to the acceleration of rubber vulcanization. The new class of compounds is characterized by the formula:

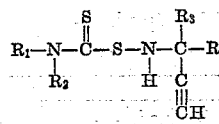

wherein $R_1$ and $R_2$ are alkyl radicals, or together constitute a cycloalkylene radical, a cyclo-dialkylene-oxy radical or any other heterocyclic radical containing oxygen or nitrogen in the ring; $R_3$ is hydrogen or an alkyl radical, and $R_4$ is a hydrocarbon or substituted hydrocarbon radical, with the proviso that $R_3$ and $R_4$, together with the carbon atom to which they are attached, can constitute a cycloalkyl radical.

The new compounds may be prepared by condensing a dithiocarbamate with an appropriate primary acetylenic amine in the presence of an oxidizing agent. Alternatively, a dithiocarbamate may be reacted with the monochloramine resulting from treating an appropriate primary acetylenic amine with sodium hypochlorite. The acetylenic amines can be prepared from the appropriate carbamyl compound in accordance with the following sereis of reactions:

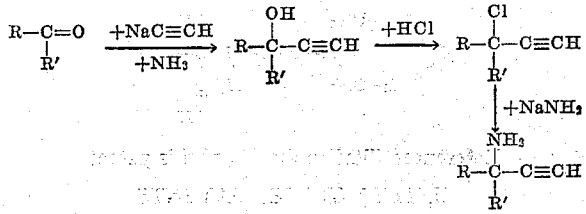

The sulfenamides of the invention are illustrated by the following example.

EXAMPLE

The acetylenic amine, 1,1-dimethyl-2-propynylamine, was obtained in accordance with the reactions set out above from acetone as the basic starting material. This amine boiled at 78.5–81° C. at atmospheric pressure and had a refractive index, $n_D^{19}$, of 1.4260.

A dithiocarbamate solution was prepared by gradually adding 6.1 grams (0.08 mole) of carbon disulfide to a solution of 7.0 grams (0.08 mole) of morpholine and 3.2 grams (0.08 mole) of sodium hydroxide in 10 ml. of water, maintaining the stirred reaction mixture at 5° to 10° C. The yellow solid dithiocarbamate which separated was dissolved by adding an additional 10 ml. of water and allowing the mixture to warm to room temperature.

A chloramine solution was separately prepared by adding 58 ml. of 2.75 molar sodium hypochlorite solution gradually over a period of 30 minutes to 20.8 grams (0.25 mole), of 1,1-dimethyl-2-propynylamine while maintaining the temperature of the reaction mixture at 0° to 5° C. After all of the hypochlorite had been added, the milky mixture was stirred an additional 15 minutes at 0° to 5° C. to insure completeness of the reaction.

Then the dithiocarbamate solution was added with stirring over a one hour period to the chloramine suspension maintained at 0° to 5° C. A yellow emulsion formed shortly after the addition began. After all the dithiocarbamate had been added, the mixture was stirred another hour at 0° to 5° C. The solid product was separated by filtration and washed free of alkali with water. Since a small sample of the crude product was only partially soluble in ether, the product was extracted with ether and the clear ether solution was evaporated. The ether insoluble product (3.6 grams) after recrystallization from ethanol melted at 143 to 145° C.; a mixed melting point with known dimorpholine thiuram disulfide showed no depression, melting at 144 to 147° C. The ether soluble product (7.4 grams, 38% yield) after recrystallization from methanol melted at 73 to 75° C. and analyzed as follows:

| | Percent nitrogen |
|---|---|
| Found | 11.18 |
| Calculated for N-oxadiethylenyl-N'-(1,1-dimethyl-2-propynyl) thiocarbamyl sulfenamide | 11.47 |

The infrared absorption spectrum of the new sulfenamide showed it to contain an acetylenic nucleus.

The sulfenamides of the invention are effective delayed-action vulcanization accelerators in any of the sulfur-vulcanizable diene rubbers including, without limitations, natural rubber, various synthetic rubbers such as SBR (butadiene-styrene), BR, IR, ABR, PBR, SIR, neoprene (polychloroprene or CR), butyl rubber (IIR) and suitable mixtures thereof. (The abbreviations are in accord with the ASTM designation: D1418–56T, published on pages 706 and 707 of "ASTM Standards on Rubber Products (With Related Information)," published in March 1957 by the American Society for Testing Materials, Philadelphia, Pa.). The usual curing temperatures employed by the art can be utilized, suitably in the range from about 250° to about 400° F. The amount of accelerator employed will depend on the particular rubber composition being vulcanized, as will be understood by one skilled in the art, for example, between 0.05 and 5 parts by weight per one hundred parts of the rubber (p.h.r.). The sulfenamides of the invention are effective accelerators of vulcanization by free sulfur or by a vulcanizing agent of the sulfur-donor type, including without limitation various known phenol polysulfides including the alkyl derivatives thereof, the xanthogen polysulfides, the thiuram disulfides and other polysulfides, various amine polysulfides including the dialkylamine polysulfides, heterocyclic amine polysulfides and reaction products of primary amines with excess sulfur. The sulfenamides are useful in all types of rubber stocks and can be mixed with the rubber on a rubber mill, in a banbury, in a solvent rubber cement, in latex or water dispersion or in any other manner known to the art of mixing a compounding ingredient with a rubber.

The new sulfenamide produced according to the example was tested as a vulcanization accelerator in a natural rubber tire tread stock containing a high loading of a reinforcing oil furnace black in accordance with Formula A.

Formula A

| Ingredients: | Parts by weight |
|---|---|
| Rubber (smoked sheets) | 100 |
| HAF carbon black | 50 |
| Zinc oxide | 3 |
| Stearic acid | 2.6 |
| Plasticizer | 3 |
| Antioxidant | 1.8 |
| Sulfur | 2.6 |
| Accelerator | 0.5 |

The rubber stock in accordance with Formula A was thoroughly mixed in the usual manner on a rubber mill, and then the stock was vulcanized at 280° F. and the following tensile data were obtained ("p.s.i." means pounds per square inch):

TABLE 1

Cure in minutes:
Modulus at 300% (p.s.i.)—
  30 _____ 1900
  45 _____ 1975
  60 _____ 1950
  90 _____ 1900
Modulus at 400% (p.s.i.)—
  30 _____ 3050
  45 _____ 3125
  60 _____ 3100
  90 _____ 3050
Tensile strength (p.s.i.)—
  30 _____ 4125
  45 _____ 4025
  60 _____ 3950
  90 _____ 3625
Elongation (percent)—
  30 _____ 500
  45 _____ 500
  60 _____ 475
  90 _____ 450

Table 1 shows that the new sulfenamide is a strong accelerator of natural rubber vulcanization, imparting high tensile properties after only 30 minutes' curing and maintaining substantially the excellent tensile properties of the stock over the wide curing range of 30 to 90 minutes at 280° F.

In a similar manner the new sulfenamide was tested as a vulcanization accelerator in a synthetic rubber tire tread stock in accordance with Formula B.

Formula B

| Ingredients: | Parts by weight |
|---|---|
| SBR (LTP)[1] | 100 |
| HAF carbon black | 48 |
| Zinc oxide | 3 |
| Petroleum oil (naphthenic) | 8 |
| Stearic acid | 2 |
| Antioxidant | 0.6 |
| Sulfur | 2 |
| Accelerator | 1.2 |

[1] Rubbery butadiene-styrene copolymer prepared by emulsion polymerization at 41° F.

The test stock in accordance with Formula B was thoroughly mixed in the usual manner on a rubber mill, and then the stock was cured at 280° F. The normal and aged tensile data are given in Table 2.

TABLE 2

NORMAL PROPERTIES

Cure in minutes:
Modulus at 400% (p.s.i.)—
  45 _____ 1225
  60 _____ 1575
  90 _____ 1850
Tensile strength (p.s.i.)—
  45 _____ 2950
  60 _____ 3075
  90 _____ 3525
Elongation (percent)—
  45 _____ 675
  60 _____ 630
  90 _____ 625

PROPERTIES AFTER AGING 2 DAYS AT 212° F. (OVEN)

Modulus at 400% (p.s.i.)—
  45 _____ 2450
  60 _____ 2750
  90 _____ —
Tensile strength (p.s.i.)—
  45 _____ 3025
  60 _____ 3150
  90 _____ 2750
Elongation (percent)—
  45 _____ 465
  60 _____ 435
  90 _____ 375

Table 2 shows that the good physical properties imparted by the new thiocarbamyl sulfenamide accelerator to a synthetic rubber tire tread stock are substantially retained after the severe aging treatment. The novel sulfenamide of the example is likewise a valuable vulcanization accelerator in other known types of sulfur-vulcanizable rubber stocks or compositions.

I claim:
A compound of the following structure:

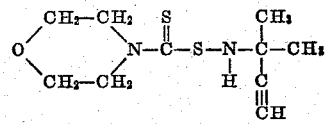

References Cited in the file of this patent

UNITED STATES PATENTS

| | | |
|---|---|---|
| 2,333,468 | Cooper | Nov. 2, 1943 |
| 2,386,457 | Hanslick | Oct. 9, 1945 |
| 2,448,714 | Hardman | Sept. 7, 1948 |